United States Patent
Matsumoto et al.

(10) Patent No.: US 10,361,642 B2
(45) Date of Patent: Jul. 23, 2019

(54) ELECTRONIC DEVICE

(71) Applicants: CITIZEN HOLDINGS CO., LTD., Tokyo (JP); CITIZEN WATCH CO., LTD., Tokyo (JP)

(72) Inventors: Kensaku Matsumoto, Tokyo (JP); Takashi Ihara, Nishitokyo (JP); Makoto Watanabe, Tokorozawa (JP); Akira Izumi, Tokyo (JP)

(73) Assignees: CITIZEN HOLDINGS CO., LTD., Tokyo (JP); CITIZEN WATCH CO., LTD., Tokyo (JP)

( * ) Notice: Subject to any disclaimer, the term of this patent is extended or adjusted under 35 U.S.C. 154(b) by 369 days.

(21) Appl. No.: 15/300,780

(22) PCT Filed: Mar. 26, 2015

(86) PCT No.: PCT/JP2015/059376
§ 371 (c)(1),
(2) Date: Sep. 30, 2016

(87) PCT Pub. No.: WO2015/151996
PCT Pub. Date: Oct. 8, 2015

(65) Prior Publication Data
US 2017/0019035 A1 Jan. 19, 2017

(30) Foreign Application Priority Data
Mar. 31, 2014 (JP) .................. 2014-073555

(51) Int. Cl.
*H02N 1/08* (2006.01)
*G04C 10/00* (2006.01)
*G04G 19/00* (2006.01)

(52) U.S. Cl.
CPC .............. *H02N 1/08* (2013.01); *G04C 10/00* (2013.01); *G04G 19/00* (2013.01)

(58) Field of Classification Search
CPC .................. H02N 1/08; G04C 10/00
(Continued)

(56) References Cited

U.S. PATENT DOCUMENTS

| 9,665,069 B2 * | 5/2017 | Hamatani | ............... G04C 10/00 |
| 10,222,761 B2 * | 3/2019 | Ihara | ....................... G04C 10/00 |

(Continued)

FOREIGN PATENT DOCUMENTS

| CN | 1213354 C | 8/2005 |
| CN | 1698019 A | 11/2005 |

(Continued)

OTHER PUBLICATIONS

English translation of the International Search Report for JP2015/059376 dated Jun. 2, 2015.
Office Action dated Dec. 26, 2017, for corresponding CN Patent Application No. 201580017557.9 and English translation thereof.

*Primary Examiner* — Alexander Talpalatski
(74) *Attorney, Agent, or Firm* — HEA Law PLLC

(57) ABSTRACT

Provided is an electronic device including a rotary power generation device using an electret, which is capable of preventing a spiral spring from being wound up or fully extended. The electronic device includes a power generation mechanism including: first rotary member, which is supported in a freely rotatable manner, and has a center of gravity shifted from a rotation center; second rotary member supported in a freely rotatable manner; an elastic member configured to elastically connect the first rotary member and the second rotary member to each other for rotary motions thereof; a stationary member arranged so as to be opposed to the second rotary member; and an electret film formed on a surface of any one of the second rotary member and the stationary member.

10 Claims, 13 Drawing Sheets

(58) Field of Classification Search
USPC .......................................... 368/208; 310/309
See application file for complete search history.

(56) References Cited

U.S. PATENT DOCUMENTS

| | | |
|---|---|---|
| 2002/0141528 A1 | 10/2002 | Koike et al. |
| 2004/0140790 A1* | 7/2004 | Matsuzawa ............ G04C 10/00 322/44 |
| 2004/0233794 A1 | 11/2004 | Maruyama et al. |
| 2005/0231184 A1 | 10/2005 | Kawaguchi et al. |
| 2006/0245304 A1 | 11/2006 | Maruyama et al. |
| 2012/0057436 A1 | 3/2012 | Sakumoto et al. |
| 2013/0241346 A1 | 9/2013 | Boisseau et al. |
| 2016/0170377 A1* | 6/2016 | Hamatan I; Yoshiki .................... G04C 10/00 368/204 |
| 2017/0110988 A1* | 4/2017 | Izumi ...................... H02N 1/08 |

FOREIGN PATENT DOCUMENTS

| | | |
|---|---|---|
| CN | 100561850 C | 11/2009 |
| CN | 103529686 A | 1/2014 |
| JP | H11-23737 A | 1/1999 |
| JP | 2010-041813 A | 2/2010 |
| JP | 2013-059149 A | 3/2013 |
| JP | 2013-135544 A | 7/2013 |
| JP | 2013-219897 A | 10/2013 |
| WO | 2011/052106 A1 | 5/2011 |

\* cited by examiner

ELECTRONIC DEVICE

CROSS REFERENCE TO RELATED APPLICATIONS

This application is a National Stage of International Application No. PCT/JP2015/059376 filed on Mar. 26, 2015, which claims priority from Japanese Patent Application 2014-073555, filed on Mar. 31, 2014. The contents of the above documents are incorporated herein by reference in their entirety.

TECHNICAL FIELD

The present invention relates to an electronic device with a power generation function.

BACKGROUND ART

In order to save the trouble of battery replacement, a small-sized portable electronic device, e.g., a wristwatch has been equipped with a power generation function. There are various types of power generation mechanisms to be used in such an electronic device, and there have been proposed power generation mechanisms that use the principle of vibration power generation using an electret.

In Patent Literature 1, there is disclosed a power generation device to be used in a portable electric device, in which an electrode configured to integrally rotate with a rotary weight supported by a spiral spring is arranged so as to be opposed to an electret film.

CITATION LIST

Patent Literature

[Patent Literature 1] JP 2013-59149 A

SUMMARY OF INVENTION

Technical Problem

The above-mentioned rotary power generation device using an electret is intended to be mounted to a portable electronic device, and is intended to generate electric power through the change in attitude of the electronic device while being carried. However, as in Patent Literature 1, when the electric device has such structure that the electrode is supported while being connected to the rotary weight, the spiral spring, and a stationary member in the stated order, the spiral spring may be wound up or fully extended depending on the change in attitude of the electronic device. Thus, the electrode may not be able to perform a rotary motion. Further, the natural angular frequency of the rotary motion of the electrode is uniquely determined by the spring constant of the spiral spring and the mass to be elastically supported by the spiral spring.

The present invention has been made in view of the above-mentioned circumstances, and has an object to provide an electronic device including a rotary power generation device using an electret, which is capable of preventing a spiral spring from being wound up or fully extended. Further, the present invention has an additional object to provide an electronic device including a rotary power generation device using an electret, which is capable of efficiently generating electric power with respect to vibrations of various periods applied from the outside.

Solution to Problem

The invention disclosed in this application to achieve the above-mentioned object has various aspects, and the representative aspects are outlined as follows.

(1) There is provided an electronic device, including a power generation mechanism including: at least one first rotary member, which is supported in a freely rotatable manner, and has a center of gravity shifted from a rotation center; at least one second rotary member supported in a freely rotatable manner; an elastic member configured to elastically connect the first rotary member and the second rotary member to each other for rotary motions thereof; a stationary member arranged so as to be opposed to the second rotary member; and an electret film formed on a surface of any one of the second rotary member and the stationary member.

(2) In the electronic device according to Item (1), a value of a moment of inertia of the first rotary member and a value of a moment of inertia of the second rotary member are different from each other.

(3) In the electronic device according to Item (2), the value of the moment of inertia of the first rotary member is larger than the value of the moment of inertia of the second rotary member.

(4) In the electronic device according to any one of Items (1) to (3), when the elastic member is in a relaxed state, the following expression is satisfied: $0°<θ<180°$, where θ represents an angle formed between a direction of the center of gravity of the first rotary member as viewed from the rotation center and a direction of a center of gravity of the second rotary member as viewed from the rotation center.

(5) In the electronic device according to any one of Items (1) to (4), the electret film is formed on the surface of the second rotary member.

(6) In the electronic device according to any one of Items (1) to (5), the second rotary member has a center of gravity shifted from the rotation center.

(7) The electronic device according to any one of Items (1) to (6) further includes: an electret film formed on a surface of the first rotary member; and an additional stationary member arranged so as to be opposed to the first rotary member.

(8) In the electronic device according to any one of Items (1) to (7) further includes a plurality of the second rotary members, a plurality of the stationary members, and a plurality of the elastic members, and the plurality of second rotary members are elastically connected to each other for rotary motions thereof by a corresponding one of the plurality of elastic members.

(9) The electronic device according to any one of Items (1) to (8) further includes a restriction portion configured to restrict extension of the elastic member to a radially configured outer side.

(10) In the electronic device according to any one of Items (1) to (8), the second rotary member has a through hole formed therein at a rotation center portion thereof, and the elastic member is received on an inner peripheral surface side of the through hole.

Advantageous Effects of Invention

According to the aspect of Item (1), in the electronic device including the rotary power generation device using an electret, the spiral spring can be prevented from being wound up or fully extended.

According to the aspect of Item (2), the frequency of the vibration input from the outside and the frequency of the rotational oscillation of the electrode to be used for power generation can be different from each other.

According to the aspect of Item (3), the frequency of the rotational oscillation of the electrode to be used for power generation can be higher than the frequency of the vibration input from the outside, and hence power generation efficiency is increased.

According to the aspect of Item (4), the sensitivity to the vibration from the outside can be increased, and electric power can be generated regardless of the direction of the input vibration.

According to the aspect of Item (5), wiring is formed on the stationary member, and hence the structure of the power generation mechanism can become simpler.

According to the aspect of Item (6), kinetic energy can be collected from various vibrations applied from the outside over a wider range of frequency, and thus the power generation efficiency is increased.

According to the aspect of Item (7), the electret film can be formed in a wide area, and a compact configuration can be obtained.

According to the aspect of Item (8), kinetic energy can be collected from various vibrations applied from the outside over a further wider range of frequency, and thus the power generation efficiency is increased.

According to the aspect of Item (9), damages on the power generation mechanism due to full extension of the spiral spring to the radially configured outer side can be suppressed.

According to the aspect of Item (10), the thickness of the power generation mechanism in the rotation axis direction can be reduced to achieve a small-sized power generation mechanism, and damages on the power generation mechanism due to full extension of the spiral spring to the radially configured outer side can be suppressed.

DESCRIPTION OF EMBODIMENTS

Figure 1:
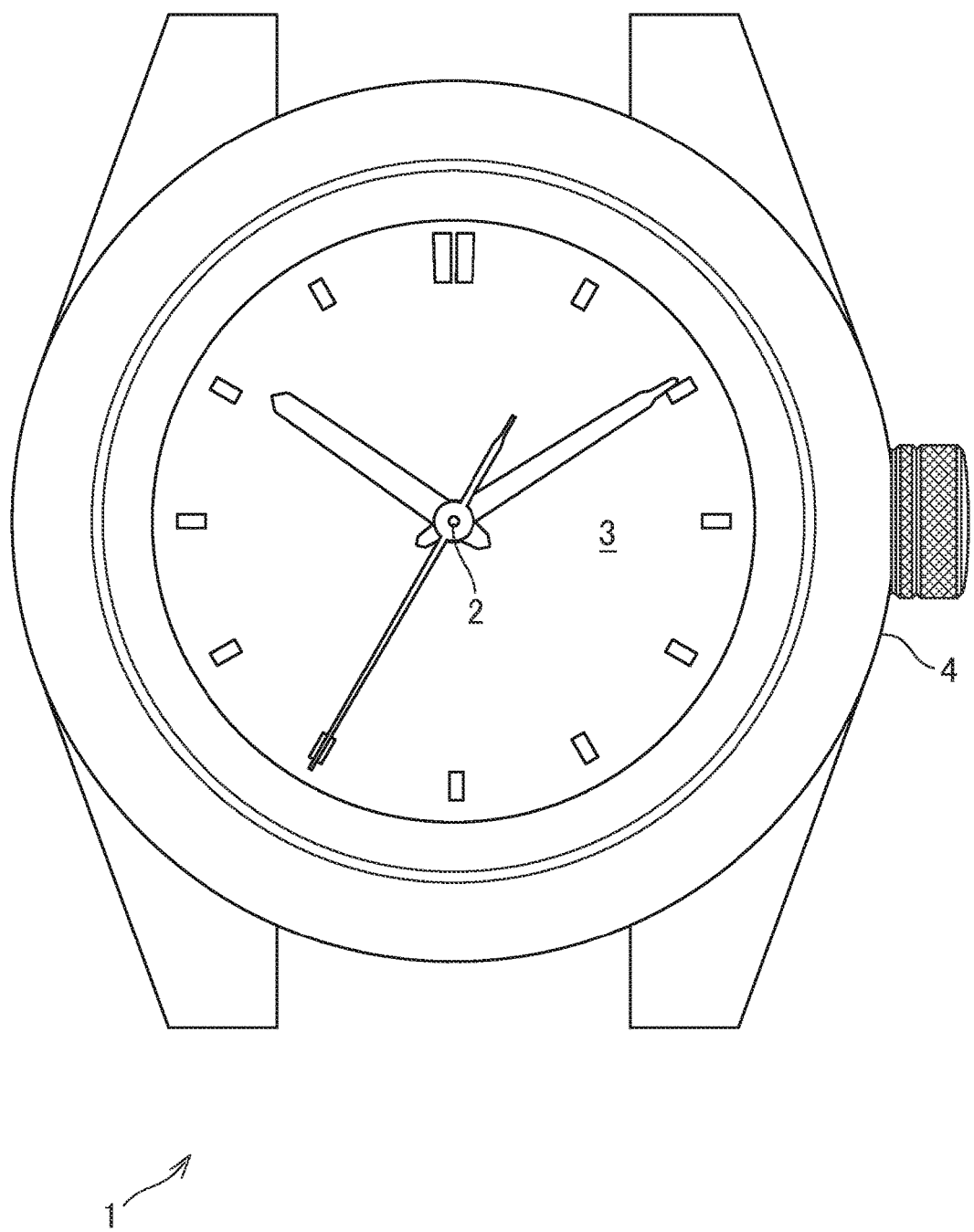
FIG. 1 is a plan view for illustrating an electronic device according to a first embodiment of the present invention.

FIG. 1 is a plan view for illustrating an electronic device 1 according to a first embodiment of the present invention. In this embodiment, the electronic device 1 is a wristwatch, but other devices such as a pocket watch, an instrument, e.g., an electronic compass, and a communication device can be employed. In any case, as described later, on the electronic device 1, a power generation mechanism, which is configured to generate electric power with use of change in attitude of the electronic device 1 itself, is planned to be mounted. Therefore, the electronic device 1 is preferred to be a device whose attitude is frequently changed, e.g., a small-sized portable device.

As illustrated in FIG. 1, the electronic device 1 is a hand-type watch. An hour hand, a minute hand, and a second hand are arranged coaxially with respect to a hand shaft 2 serving as a rotation center, which is arranged at the center of the electronic device 1. However, the number of hands and the arrangement thereof are arbitrary and are not limited to the above. Further, the electronic device 1 may be a so-called digital electronic device configured to display information with use of a liquid crystal display or an organic EL display, or a combination thereof. As a matter of course, when the electronic device 1 is not a watch, the electronic device 1 has an external appearance depending on its function.

The electronic device 1 is configured to receive, inside a case 4, a power generation mechanism, a movement, and an electricity storage device to be described later. Those mechanisms are arranged behind a watch face 3 to be covered therewith. The design of the watch face 3 exemplified in FIG. 1 is also arbitrary. The electronic device 1 may have a so-called skeleton specification by using a transparent watch face 3 or omitting the watch face 3 so that the mechanisms inside the case 4 may be visible. In this case, in this embodiment, the power generation mechanism is arranged right behind the watch face 3 as described later, and hence the user of the electronic device 1 can view this power generation mechanism. However, the arrangement of the respective mechanisms received inside the case 4 is also arbitrary.

Figure 2:
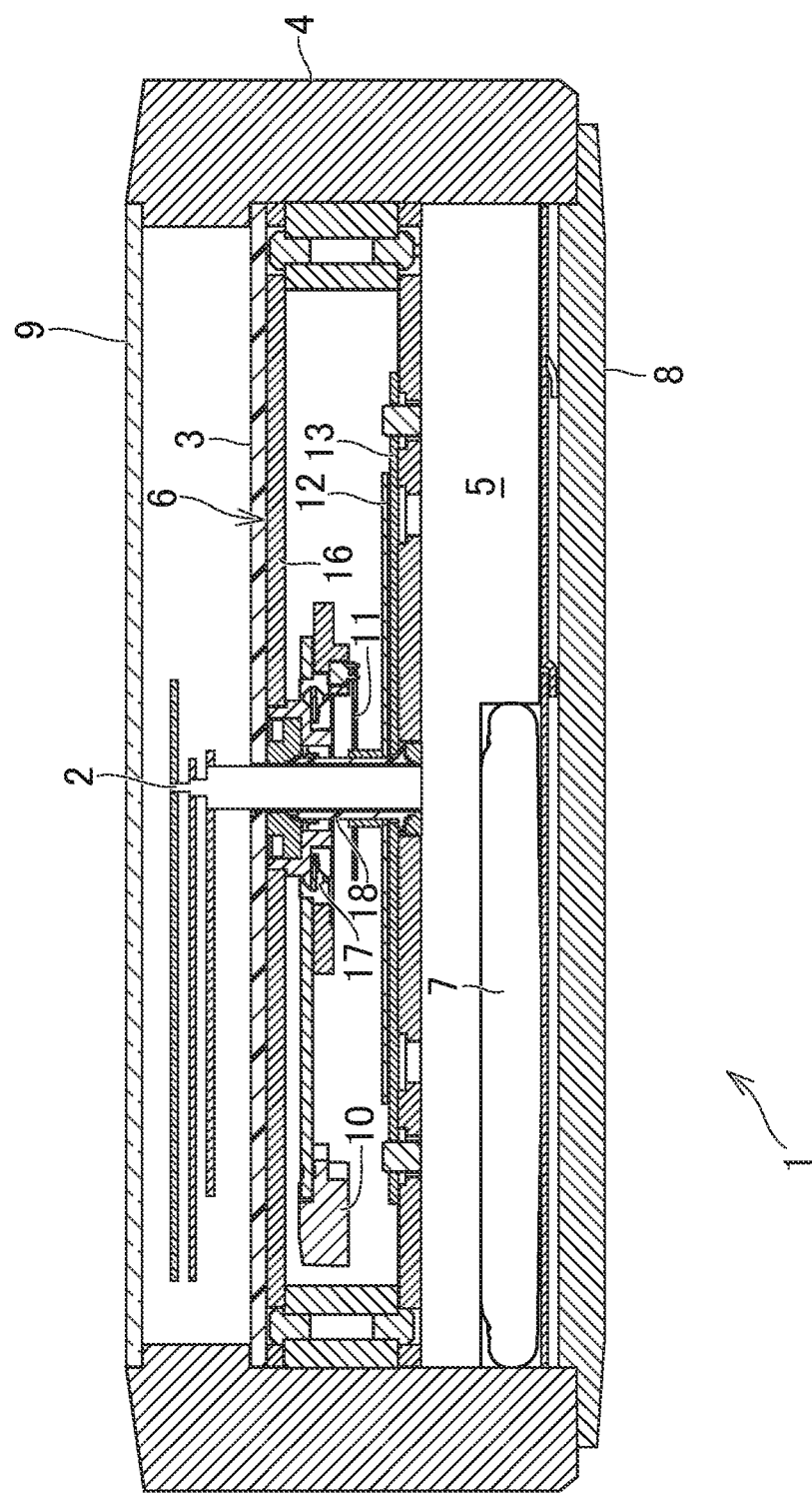
FIG. 2 is a sectional view for illustrating the electronic device according to the first embodiment of the present invention.

FIG. 2 is a sectional view for illustrating the electronic device 1 according to this embodiment. Inside the case 4, a movement 5 is received, and a power generation mechanism 6 and the watch face 3 are arranged above the movement 5 in the stated order. Further, under the movement 5, an electricity storage device 7 is mounted. Those mechanisms are inserted from the lower side of the case 4, and are fixed inside the case 4 by a back cover 8. Further, the hand shaft 2 extending from the movement 5 and passing through the power generation mechanism 6 is protruded from the center of the watch face 3, and the respective hands are mounted to the hand shaft 2. On the upper side of the case 4, a transparent watch crystal 9, e.g., glass is mounted, to thereby protect the respective hands and the watch face.

In this embodiment, the outer diameter of the power generation mechanism 6 in plan view is substantially equal to that of the movement 5, and the power generation mechanism 6 and the movement 5 are stacked in the height direction of the electronic device 1. However, this structure is not essential. The vertical arrangement of the power generation mechanism 6 and the movement 5 can be reversed, or the power generation mechanism 6 may be incorporated as a part of the movement 5.

Now, the respective members are simply described. The watch face 3 is arranged on the upper surface of the power generation mechanism 6, and various indications such as hour marks are formed on the surface of the watch face 3, so that the user of the electronic device 1 can read the time pointed by the hands. The material of the watch face 3 is not particularly limited, and a synthetic resin, natural materials such as shells and rocks, and various metals may be used.

The movement 5 is formed by integrally mounting a wheel train and a motor configured to drive the hands, a clock circuit including a crystal unit configured to count the time, a controller configured to control the entire electronic device 1, and the like onto a frame called a main plate. The movement 5 is configured to operate by obtaining electric power from the electricity storage device 7 mounted to the movement 5. The electricity storage device 7 is configured to supply electric power to the movement 5, and to simultaneously store electric power generated by the power generation mechanism 6. In this case, the electricity storage device 7 is a button-type lithium secondary battery. However, the shape and the type of the electricity storage device 7 are not particularly limited, and in addition to various secondary batteries, electrical double layer capacitors, e.g., a lithium ion capacitor, may be used.

The power generation mechanism 6 is a rotary power generation device using an electret. The power generation mechanism 6 is configured to extract energy of vibration, which is caused by change in attitude of the electronic device 1, e.g., the motion of the arm when the user wearing the electronic device 1 on his/her arm is walking, as a rotary motion by a rotary weight 10, and to rotationally oscillate an electret electrode 12 via a spiral spring 11, to thereby collect the motion as electric energy by a counter electrode 13. In this embodiment, the rotary weight 10 and the electret electrode 12 are respectively supported in a freely rotatable manner coaxially to the hand shaft 2 by supporting the rotary weight 10 by a bearing 17, which is fixed to a power generator case 16, and further by fixing the electret electrode 12 to a hollow shaft 18, which is rotationally supported by the power generator case 16. This configuration is merely an example, and the support method and the position of the rotation axis are not limited as long as the rotary weight 10 and the electret electrode 12 are respectively supported in a freely rotatable manner.

Figure 3:
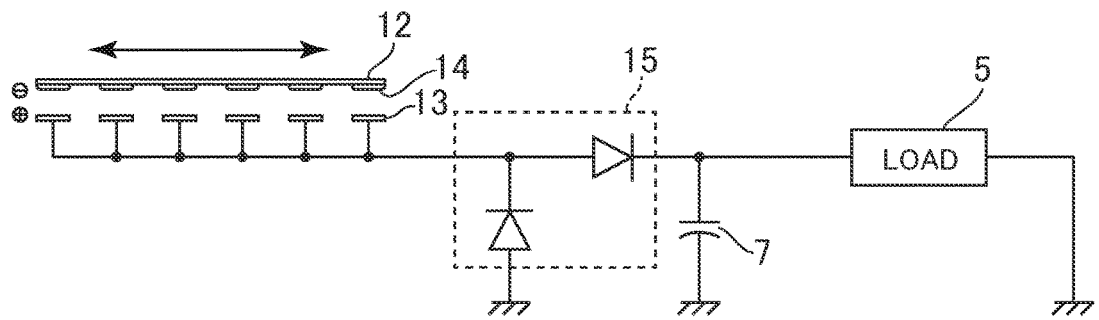
FIG. 3 is a schematic circuit diagram for illustrating an operating principle of a power generation mechanism.

FIG. 3 is a schematic circuit diagram for illustrating the operating principle of the power generation mechanism 6. As illustrated in FIG. 3, the electret electrode 12 and the counter electrode 13 are arranged opposed to each other so as to be parallel to each other with a predetermined small gap secured therebetween. Both of the electret electrode 12 and the counter electrode 13 are supported so that the electret electrode 12 and the counter electrode 13 can be relatively moved to some extent in an in-plane direction thereof. In this embodiment, the counter electrode 13 is fixed, and the electret electrode 12 is supported so as to rotationally oscillate in its in-plane direction.

On the surface of the electret electrode 12 on the counter electrode 13 side, an electret film 14 is formed in a predetermined charged state. In the illustrated example, the electret film 14 is charged such that the counter electrode 13 side thereof has negative charges. Further, the electret film 14 and the counter electrode 13 have planar shapes that are substantially equal stripe patterns. With the relative movement between the electret film 14 and the counter electrode 13, a facing state and a non-facing state between the electret film 14 and the counter electrode 13 are switched.

With this, under a state in which the counter electrode 13 is facing the electret film 14, the surface charges of the electret film 14 induce the opposite-polarity charges in the counter electrode 13 so as to accumulate the opposite-polarity charges in the counter electrode 13 (in the illustrated example, positive charges are accumulated in the counter electrode 13). After that, when the electret electrode 12 is moved to obtain a state in which the electret film 14 is not facing the counter electrode 13, the charges induced and accumulated in the counter electrode 13 are swept, to thereby be rectified by a rectifier circuit 15 and then accumulated in the electricity storage device 7. A load, e.g., the movement 5, is driven with use of electric power stored in the electricity storage device 7 in this way.

In this case, an easily chargeable material is used as the material of the electret film 14. Examples of a material to be negatively charged include silicon oxide and a fluororesin. As a specific example of such a material, CYTOP (trademark), which is a fluororesin produced by ASAHI GLASS CO., LTD., can be given. In addition, other examples that can be used as the electret film 14 include: polymer materials, such as polypropylene, polyethylene terephthalate, polyvinyl chloride, polystyrene, polytetrafluoroethylene, polyvinylidene difluoride, and polyvinyl fluoride; and inorganic materials, such as silicon oxide described above, silicon nitride, and silicon oxynitride.

Figure 4:
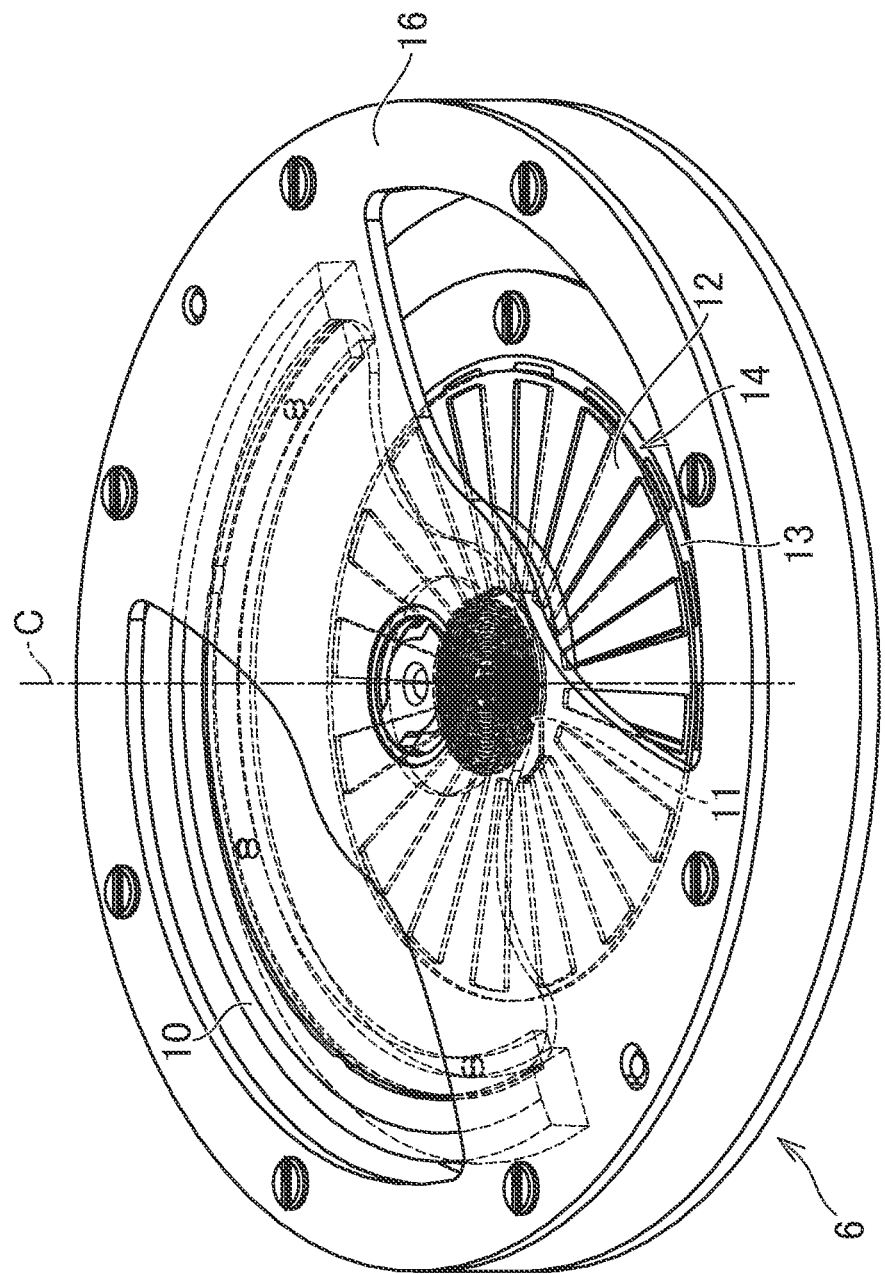
FIG. 4 is a perspective view for illustrating the power generation mechanism.

FIG. 4 is a perspective view for illustrating the power generation mechanism 6. From openings formed in the power generator case 16, the rotary weight 10, the electret electrode 12, and the counter electrode 13 can be partially observed. In FIG. 4, parts that cannot be partially observed due to the presence of the power generator case 16 are represented by the broken lines.

As illustrated in FIG. 4, the rotary weight 10 is arranged such that its center of gravity is shifted from an axis C being the rotation center, and is supported so as to be freely rotatable about the axis C in accordance with the change in attitude of the power generation mechanism 6 (that is, electronic device 1) or the acceleration acting thereon. Meanwhile, a large number of radial slits are formed in the electret electrode 12 as illustrated in FIG. 4, to thereby form a stripe pattern in a circumferential direction. The electret film 14 is formed on the surface of the electret electrode 12 opposing to the counter electrode 13 (lower surface in FIG. 4). The electret electrode 12 is also supported so as to be freely rotatable about the axis C. In this embodiment, the position of the center of gravity of the electret electrode 12 matches with the axis C.

Meanwhile, the counter electrode 13 is fixed to the power generator case 16. In the illustrated structure, the electret electrode 12 and the counter electrode 13 may be replaced with each other. However, wiring to the rectifier circuit 15 illustrated in FIG. 3 is necessary in the counter electrode 13, and hence it is better to fix the counter electrode 13 to simplify the structure of the power generation mechanism 6.

Then, the rotary weight 10 and the electret electrode 12 are connected to each other with the spiral spring 11. With this, when the spiral spring 11 is at its free length, the electret electrode 12 does not particularly move rotationally, but as the rotary weight 10 is rotated by the gravitational acceleration caused by the attitude change or the acceleration acting from the outside, the spiral spring 11 is wound up or wound off. Therefore, the spiral spring 11 and the electret electrode 12 forma simple oscillation system with respect to the rotary weight 10, and the electret electrode 12 starts to rotationally oscillate. With this rotational oscillation of the electret electrode 12, the power generation mechanism 6 collects and rectifies the charges induced to the counter electrode 13, to thereby generate electric power.

Figure 5:
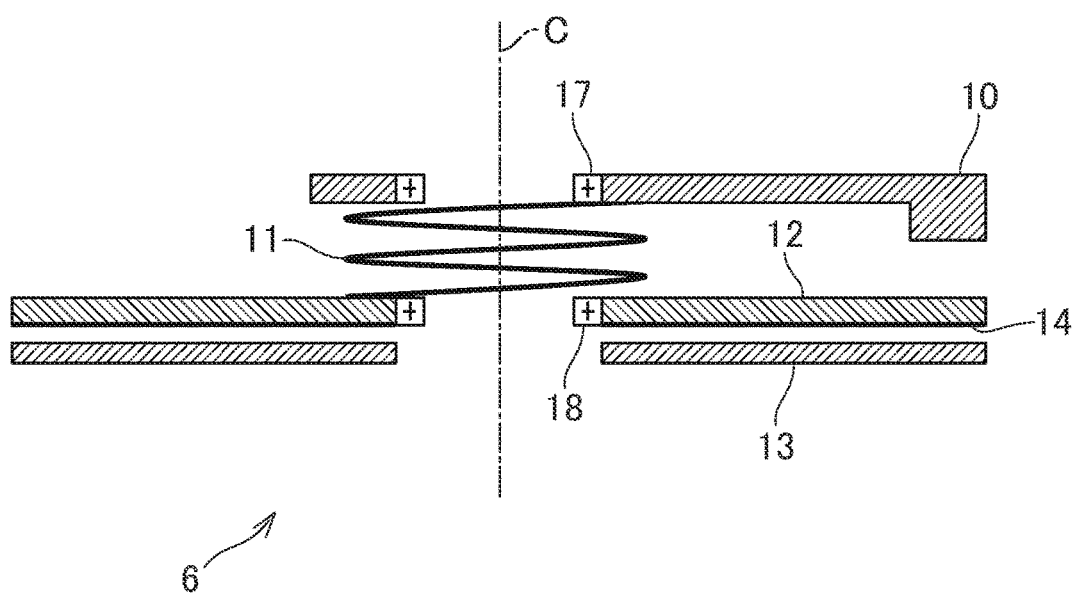
FIG. 5 is a schematic sectional view for illustrating the structure of a main part of the power generation mechanism according to the first embodiment of the present invention.

FIG. 5 is a schematic sectional view for illustrating the structure of a main part of the power generation mechanism 6 according to this embodiment. As illustrated in FIG. 5, the rotary weight 10 is supported in a freely rotatable manner by the bearing 17 with respect to the axis C being the rotation center. Further, the electret electrode 12 is similarly supported in a freely rotatable manner by the hollow shaft 18 with respect to the axis C. Then, with the spiral spring 11, the rotary weight 10 and the electret electrode 12 are elastically supported with respect to each other for their rotary motions about the axis C. The surface of the electret electrode 12 opposing to the counter electrode 13 has the electret film 14 formed thereon, and the counter electrode 13 is fixed to the power generator case 16 (not shown).

In this structure, the spiral spring 11 is mounted to the rotary weight 10 and the electret electrode 12, but is not mounted to a stationary member, e.g., the power generator case 16. Therefore, the spiral spring 11 is freely rotatable as a whole, and thus is not wound up or fully extended. Further, a moment of inertia $I_w$ of the rotary weight 10 and a moment of inertia $I_e$ of the electret electrode 12 are determined so as to satisfy $I_w > I_e$. In general, the frequency of the rotational oscillation detected by the rotary weight 10 due to the motion of the user, e.g., arm swinging, is from about 3 Hz to about 5 Hz, but in vibration power generation using an electret, as a result of experiments, it is found that the maximum power generation efficiency is obtained when the rotational oscillation is from 30 Hz to 40 Hz or more. The period of the simple oscillation is inversely proportional to the square root of the moment of inertia. Therefore, by setting to $I_w > I_e$, the electret electrode 12 can oscillate at a period higher than that of the rotary weight 10, and electric power can be generated with higher efficiency.

The present invention can be generally described as an electronic device, including a power generation mechanism including: at least one first rotary member, which is supported in a freely rotatable manner, and has a center of gravity shifted from a rotation center; at least one second rotary member supported in a freely rotatable manner; an elastic member configured to elastically connect the first rotary member and the second rotary member to each other for rotary motions thereof; a stationary member arranged so as to be opposed to the second rotary member; and an electret film 14 formed on a surface of any one of the second rotary member and the stationary member. In this embodiment, the rotary weight 10 corresponds to the first rotary member, the electret electrode 12 corresponds to the second rotary member, the spiral spring 11 corresponds to the elastic member, and the counter electrode 13 corresponds to the stationary member. The electret film 14 is formed on the electret electrode 12, that is, the second rotary member.

Figure 6:
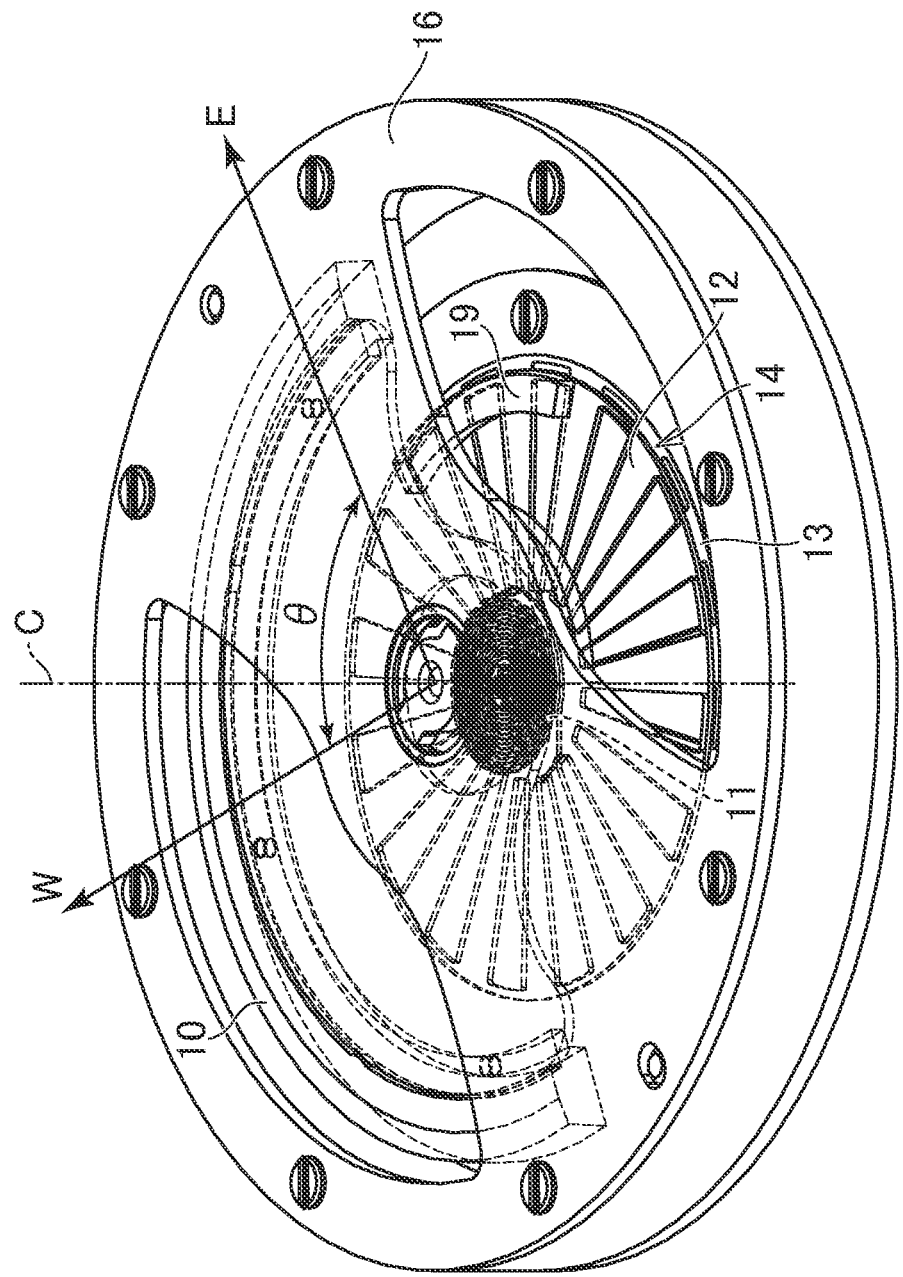
FIG. 6 is a perspective view of a first modified example of the power generation mechanism.

FIG. 6 is a perspective view of a first modified example of the power generation mechanism 6. This modified example is different from the example described above and illustrated in FIG. 4 in that a second rotary weight 19 is mounted to a part of the outer periphery of the electret electrode 12. The second rotary weight 19 is mounted to the electret electrode 12, and hence the position of the center of gravity of the electret electrode 12 is shifted from the rotation axis C. Further, in this modified example, similarly to the example described above, the value of the moment of inertia $I_w$ of the rotary weight 10 and the value of the moment of inertia $I_e$ of the electret electrode 12 are different from each other (in this modified example, $I_w > I_e$). In this manner, the system of the power generation mechanism 6 becomes a coupled oscillation system to have two natural angular frequencies. Therefore, kinetic energy can be collected from various vibrations applied from the outside over a wider range of frequency, and thus the power generation efficiency is increased.

Further, in plan view, when the direction of the center of gravity of the rotary weight 10 with respect to the axis C is represented by W, the direction of the center of gravity of the electret electrode 12 with respect to the axis C is represented by E, and an angle formed between W and E is represented by θ, 0°<θ<180° is preferred, and 45°<θ<135° is more preferred. In this modified example, θ=90° is satisfied.

Figure 7:
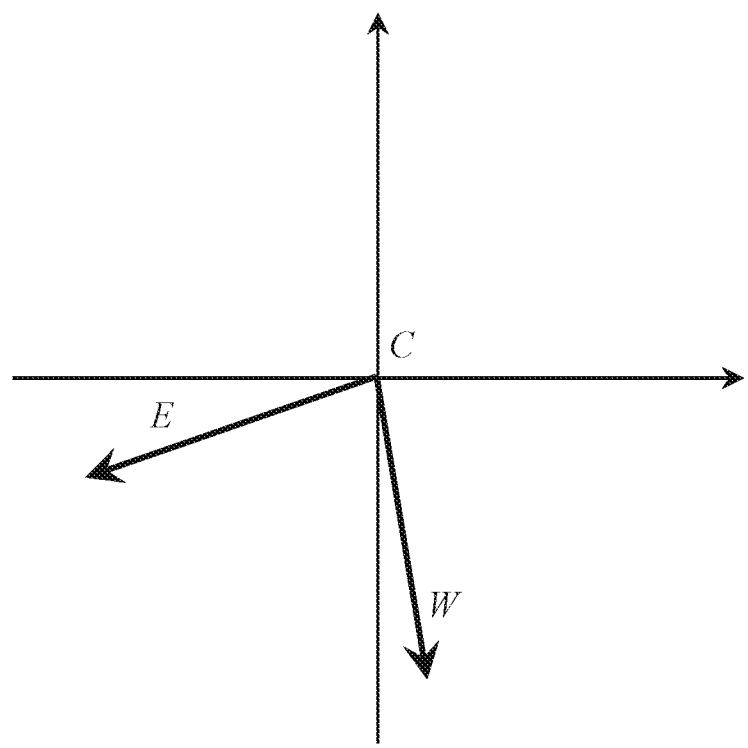
FIG. 7 is a graph for showing directions of W and E when an axis C is oriented in a horizontal direction.

Two effects can be expected by this configuration. FIG. 7 is a graph for showing directions of W and E when the axis C is oriented in the horizontal direction. In FIG. 7, the vertical axis represents the vertical direction, and the lateral axis represents the horizontal direction. Under this state, as shown in FIG. 7, W and E become stable in directions in which the composite center of gravity of W and E is directed vertically downward with respect to the axis C. At this time, due to the gravity, a torque in a clockwise direction in FIG. 7 is generated to the rotary weight 10 such that W is directed vertically downward, and a torque in a counterclockwise direction in FIG. 7 is generated to the electret electrode 12 such that E is directed vertically downward. Those torques act so as to slightly wind up or wind off the spiral spring 11. Therefore, in a free state, the spiral spring 11 is in a state of being slightly wound up or wound off (that is, an angle formed between W and E in FIG. 7 is smaller than θ). In this case, when vibration is input to the power generation mechanism 6 from the outside, and when the spiral spring 11 is in a relaxed state, the spiral spring 11 tends to absorb this vibration to inhibit the start of the oscillation, while when the spiral spring 11 is in a tensioned state, the spiral spring 11 tends to sensitively react to this vibration to quickly start the oscillation. Therefore, in the configuration of this modified example, a first effect that the sensitivity is increased with respect to the vibration from the outside can be expected.

Further, the difference in the value of the moment of inertia between the rotary weight 10 and the electret electrode 12 is mainly caused by the mass difference therebetween. Therefore, in this case, as shown in FIG. 7, W is stable in a direction substantially close to the vertically downward direction, and E is stable in a direction substantially close to the horizontal direction. Therefore, the center of gravity of the rotary weight 10 tends to move substantially in the horizontal direction, and the center of gravity of the electret electrode 12 tends to move substantially in the vertical direction. Therefore, when a vibration in the horizontal direction is applied to the power generation mechanism 6, the vibration is absorbed by the rotary weight 10, and when a vibration in the vertical direction is applied to the power generation mechanism 6, the vibration is absorbed by the electret electrode 12. Therefore, in the configuration of this modified example, a second effect that electric power can be generated regardless of the direction of the vibration applied to the power generation mechanism 6 can be expected.

Figure 8:
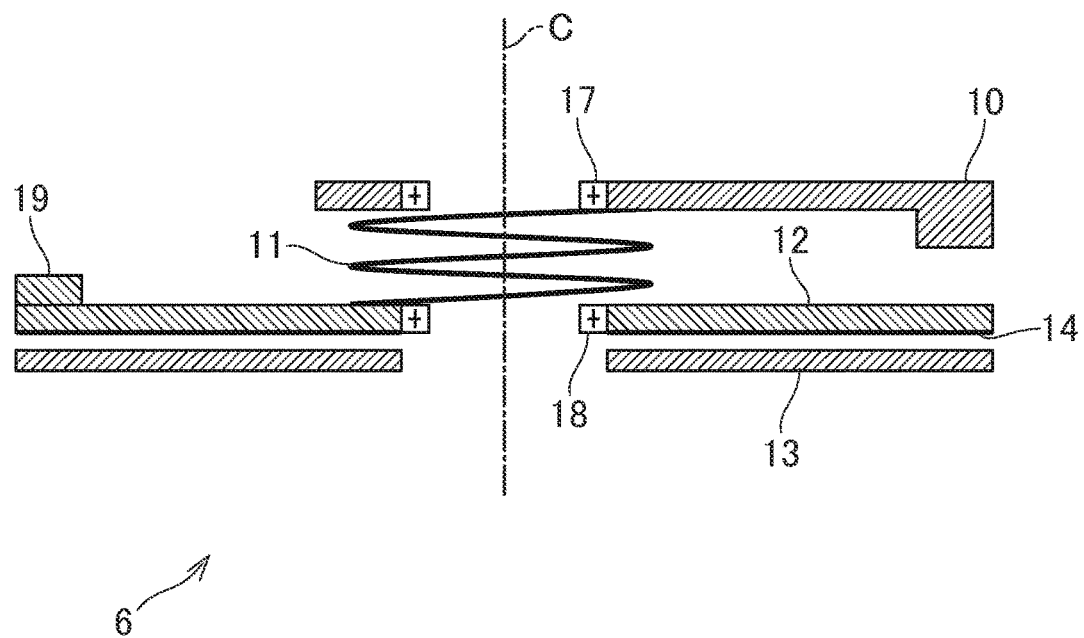
FIG. 8 is a schematic sectional view for illustrating the structure of a main part of the power generation mechanism according to the first modified example of the power generation mechanism.

FIG. 8 is a schematic sectional view for illustrating the structure of a main part of the power generation mechanism 6 according to this modified example. Also in this example, the rotary weight 10 and the electret electrode 12 are supported in a freely rotatable manner with respect to the axis C, and are elastically supported with respect to each other for their rotary motions about the axis C by the spiral spring 11. The second rotary weight 19 is mounted to the outer peripheral portion of the electret electrode 12. As described above, fixing of the second rotary weight 19 to the electret electrode 12 is not limited to a mode of fixing the second rotary weight 19 to the upper surface of the electret electrode 12. Instead, the second rotary weight 19 may be fixed to the outer peripheral surface of the electret electrode 12, or the second rotary weight 19 may be separately fixed to the hollow shaft 18 (see FIG. 2) to which the electret electrode 12 is fixed.

Figure 9:
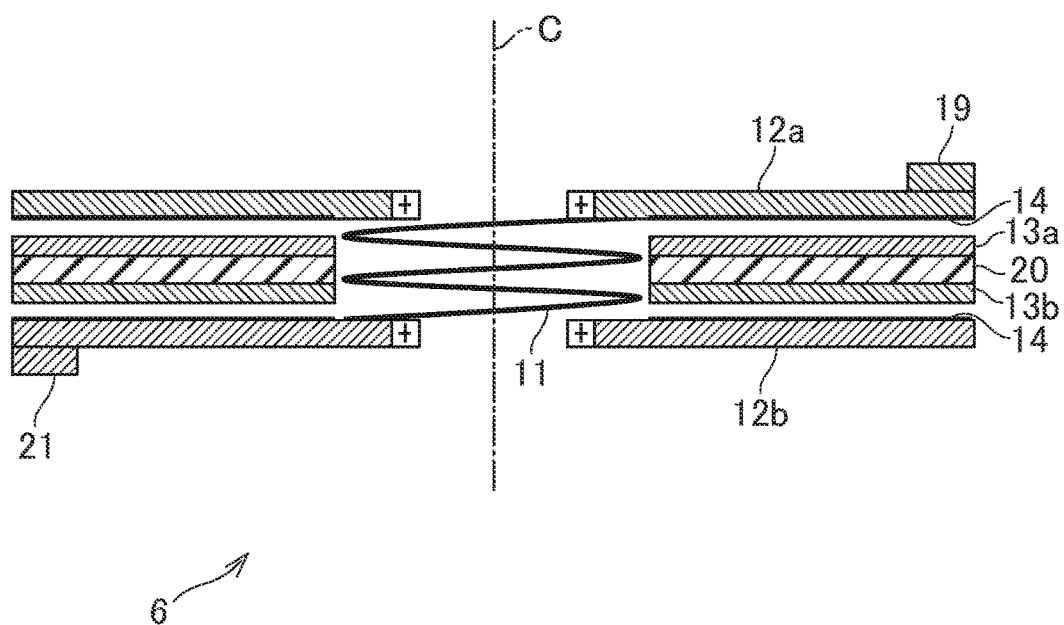
FIG. 9 is a schematic sectional view for illustrating the structure of a main part according to a second modified example of the power generation mechanism.

Further modifications are possible in the power generation mechanism 6. FIG. 9 is a schematic sectional view for illustrating the structure of a main part of a second modified example of the power generation mechanism 6. In this modified example, instead of using the rotary weight, two electret electrodes are used.

That is, two first and second electret electrodes 12*a* and 12*b* are each supported in a freely rotatable manner with respect to the axis C, and the electret film 14 is formed on a surface of each of the first and second electret electrodes 12*a* and 12*b* on such a side that the first and second electret electrodes 12*a* and 12*b* are opposed to each other. An insulating stationary substrate 20 is arranged between the first electret electrode 12*a* and the second electret electrode 12*b*. On both surfaces of the stationary substrate 20, a first counter electrode 13*a* and a second counter electrode 13*b* are formed so as to be opposed to the first electret electrode 12*a* and the second electret electrode 12*b*, respectively. The second rotary weight 19 is arranged on the outer peripheral portion of the first electret electrode 12*a*, and a third rotary weight 21 is arranged on the outer peripheral portion of the second electret electrode 12*b*. Further, with the spiral spring 11, the first electret electrode 12*a* and the second electret electrode 12*b* are elastically supported with respect to each other for their rotary motions about the axis C.

In this structure, electric power is generated based on both of the rotational oscillation of the first electret electrode 12*a* and the rotational oscillation of the second electret electrode 12*b*. Therefore, the area of the electret film 14 can be increased, and a compact configuration can be obtained. Further, by mounting the second rotary weight 19, the center of gravity of the first electret electrode 12*a* is shifted from the axis C, and by mounting the third rotary weight 21, the center of gravity of the second electret electrode 12*b* is also shifted from the axis C. Similarly to the case described in the modified example above, also in this modified example, it is desired that a value of a moment of inertia $I_{e1}$ of the first electret electrode 12*a* and a value of a moment of inertia $I_e$ of the second electret electrode 12*b* be set different from each other. Further, in plan view, when the direction of the center of gravity of the first electret electrode 12*a* with respect to the axis C is represented by E1, the direction of the center of gravity of the second electret electrode 12*b* is represented by E2, and the angle formed between E1 and E2 is represented by θ, 0°<θ<180° is preferred, and 45°<θ<135° is more preferred. In this modified example, θ=90° is satisfied.

When this modified example is described in light of the general expression of the present invention described above, the first rotary member may be anyone of the first electret electrode 12*a* and the second electret electrode 12*b*, and the second rotary member is another one of the first electret electrode 12*a* and the second electret electrode 12*b*. The spiral spring 11 corresponds to the elastic member, and the first counter electrode 13*a* or the second counter electrode 13*b* corresponds to the stationary member.

Figure 10:
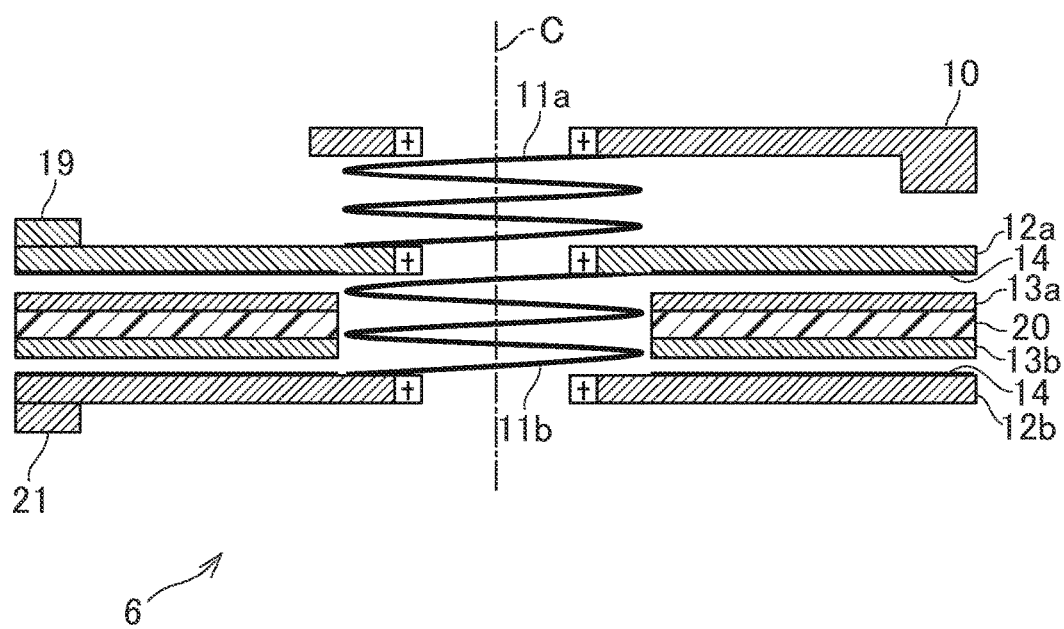
FIG. 10 is a schematic sectional view for illustrating the structure of a main part according to a third modified example of the power generation mechanism.

FIG. 10 is a schematic sectional view for illustrating the structure of a main part of a third modified example of the power generation mechanism 6. In this modified example, in addition to the rotary weight, the two electret electrodes are used.

That is, three members, specifically, the rotary weight 10, the first electret electrode 12*a*, and the second electret electrode 12*b* are supported in a freely rotatable manner with respect to the axis C. The electret film 14 is formed on each of the surfaces of the first and second electret electrodes 12*a* and 12*b* on such a side that the first electret electrode 12*a* and the second electret electrode 12*b* are opposed to each other. Further, the insulating stationary substrate 20 is arranged between the first electret electrode 12*a* and the second electret electrode 12*b*. On both surfaces of the stationary substrate 20, the first counter electrode 13*a* and the second counter electrode 13*b* are formed so as to be opposed to the first electret electrode 12*a* and the second electret electrode 12*b*, respectively. The second rotary weight 19 is arranged on the outer peripheral portion of the first electret electrode 12*a*, and the third rotary weight 21 is arranged on the outer peripheral portion of the second electret electrode 12*b*. Further, with a first spiral spring 11*a*, the rotary weight 10 and the first electret electrode 12*a* are elastically supported with respect to each other for their rotary motions about the axis C, whereas with a second spiral spring 11*b*, the first electret electrode 12*a* and the second electret electrode 12*b* are elastically supported with respect to each other for their rotary motions about the axis C.

In this structure, the three members, specifically, the rotary weight 10, the first electret electrode 12*a*, and the second electret electrode 12*b* are elastically supported in a freely rotatable manner, to thereby form a coupled oscillation system with three degrees of freedom. Therefore, there are three natural angular frequencies in the system of this modified example, and electric power can be generated from vibration input with a wider range of frequency.

Figure 11:
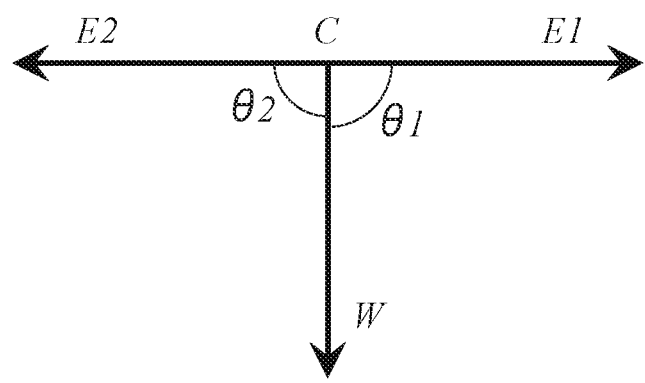
FIG. 11 is a diagram for illustrating a relationship of directions of W, E1, and E2 in the third modified example of the power generation mechanism.

Also in this modified example, it is desired that the value of the moment of inertia $I_w$ of the rotary weight 10, the value of the moment of inertia $I_{e1}$ of the first electret electrode 12*a*, and a value of the moment of inertia $I_e$ of the second electret electrode 12*b* be set different from each other. Further, it is desired that the member having the largest moment of inertia be the rotary weight 10. As illustrated in FIG. 11, in plan view, when the direction of the center of gravity of the rotary weight 10 with respect to the axis C is represented by W, the direction of the center of gravity of the first electret electrode 12*a* is represented by E1, the direction of the center of gravity of the second electret electrode 12*b* is represented by E2, the angle formed between W and E1 is represented by θ1, and the angle formed between W and E2 is represented by θ2, 0°<θ1<180° and 0°<θ2<180° are preferred, and 45°<θ1<135° and 45°<θ2<135° are more preferred. In this modified example, θ1=θ2=90° is satisfied.

When this modified example is described in light of the general expression of the present invention described above, the rotary weight 10 corresponds to the first rotary member, and the second rotary member includes a plurality of (two) second rotary members, specifically, the first electret electrode 12*a* and the second electret electrode 12*b*. The first spiral spring 11a and the second spiral spring 11b correspond to the elastic member, and the first counter electrode 13a and the second counter electrode 13b correspond to the stationary member. Thus, the elastic member and the stationary member also include a plurality of (two) elastic members and a plurality of (two) stationary members, respectively. Then, the plurality of second rotary members, that is, the first electret electrode 12a and the second electret electrode 12b are elastically connected to each other for their rotary motions by the elastic member (second spiral spring 11b).

The example above describes a case where only one rotary weight and one or two electret electrodes are provided, but the numbers of those members can be further increased, and the same applies in the following. In this case, freely rotatable members may be sequentially supported elastically with respect to each other for their rotary motions about the axis C by the spiral spring, to thereby form a so-called coupled oscillation system as a whole. The number of natural angular frequencies is increased as the degree of freedom of the system is increased, and hence response to a wider range of frequency is possible.

Figure 12:
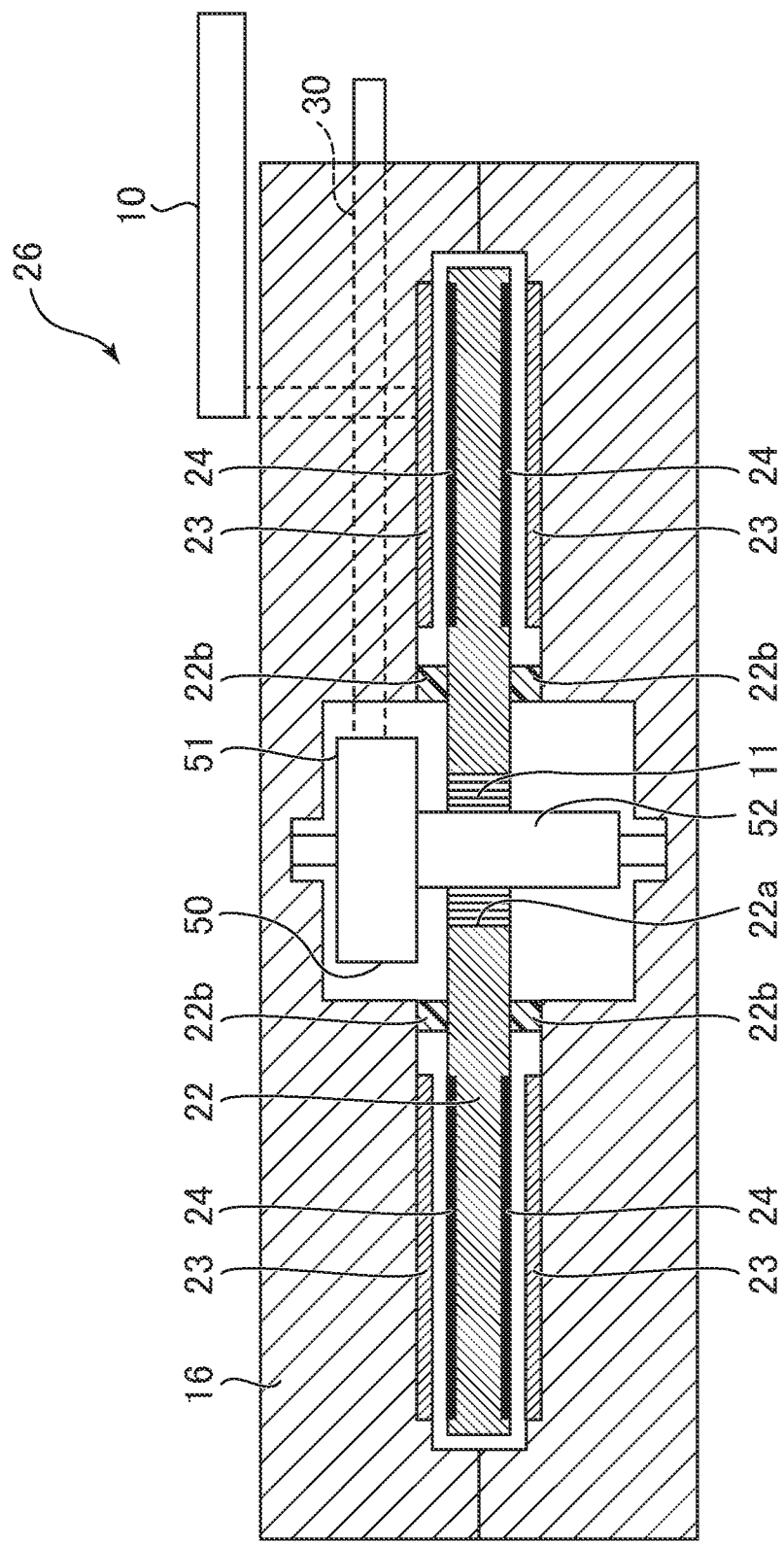
FIG. 12 is a schematic sectional view for illustrating a power generation mechanism according to a second embodiment of the present invention.

FIG. 12 is a schematic sectional view for illustrating a power generation mechanism 26 according to a second embodiment of the present invention. The operating principle of the power generation mechanism 26 of the second embodiment described below is similar to that described in the first embodiment, and hence detailed description thereof is omitted herein. As illustrated in FIG. 12, the power generation mechanism 26 includes an electret electrode 22, counter electrodes 23, and a fixing wheel 50, and those members are received in the power generator case 16. In the second embodiment, electret films 24 are formed on both surfaces of the electret electrode 22, respectively, and the counter electrodes 23 are fixed to the power generator case 16 so as to be opposed to the respective electret films 24. The fixing wheel 50 includes a gear portion 51 configured to mesh with a speed increaser 30, and a rotary shaft 52 that is supported about an axis on the power generator case 16. The rotational force of the rotary weight 10 whose center of gravity is shifted from the rotation center is transmitted to the fixing wheel 50 after being increased in speed by the speed increaser 30, to thereby rotate the fixing wheel 50 about the rotary shaft 52. The speed increaser 30 may be a speed-increasing wheel train including a plurality of gears having different gear ratios. Further, the speed increaser 30 is not an essential configuration, and hence a configuration without the speed increaser 30 can be employed, in which the rotary weight 10 and the fixing wheel 50 are coaxially rotated.

Further, a through hole is formed at the rotation center portion of the electret electrode 22, and the rotary shaft 52 of the fixing wheel 50 is inserted through this through hole. Then, the spiral spring 11 is received on an inner peripheral surface 22a side of the electret electrode 22 such that the inner peripheral surface 22a of the through hole of the electret electrode 22 and an outer peripheral surface of the rotary shaft 52 of the fixing wheel 50 are elastically connected to each other for their rotary motions. The electret electrode 22 and the spiral spring 11 may be integrally molded with use of a micro-electro mechanical system (MEMS) technology.

Further, in order to maintain an appropriate gap between the electret electrode 22 and the counter electrode 23, the electret electrode 22 includes a guide portion 22b configured to slide against the power generator case 16 along with the rotation of the electret electrode 22. The guide portion 22b may be formed annular, or may be formed partially in the circumferential direction. Further, the guide portion 22b may be fixed on the power generator case 16 side instead of being formed on the electret electrode 22 side, so as to slide against the electret electrode 22 being rotated.

Further, in the example illustrated in FIG. 12, the guide portion 22b is formed on the radially inner side of the electret electrode 22, but the present invention is not limited thereto. The guide portion 22b may be formed on the radially configured outer side, e.g., an outer edge, or may be formed on both of the radially inner side and the radially configured outer side. Further, the material of the guide portion 22b is preferred to have small friction and excellent slidability. For example, fluororesins, e.g., polytetrafluoroethylene (PTFE), and oil-impregnated sintered metals may be used. Further, films of those materials may be formed on the sliding surface.

By employing the configuration described above, in the second embodiment, the extension of the spiral spring 11 to the radially configured outer side is restricted by the inner peripheral surface 22a of the through hole of the electret electrode 22. Therefore, in addition to the effects described in the first embodiment, an effect of suppressing damages on the power generation mechanism 26 due to the full extension of the spiral spring 11 to the radially configured outer side can be expected. Further, the spiral spring 11 is received on the inner peripheral surface 22a side of the electret electrode 22, and accordingly the thickness of the power generation mechanism 26 in the rotary shaft 52 direction can be reduced. Therefore, an effect of downsizing the power generation mechanism 26 can also be expected.

Further, the electret electrode 22 is supported by the spiral spring 11, and hence the position of the electret electrode 22 in its thickness direction is liable to change, but the gap between the electret electrode 22 and the counter electrode 23 is maintained constant by the guide portion 22b.

When the second embodiment is described in light of the general expression of the present invention, the rotary weight 10 corresponds to the first rotary member, the electret electrode 22 corresponds to the second rotary member, the spiral spring 11 corresponds to the elastic member, the counter electrode 23 corresponds to the stationary member, and the inner peripheral surface 22a of the through hole corresponds to a restriction portion.

Figure 13:
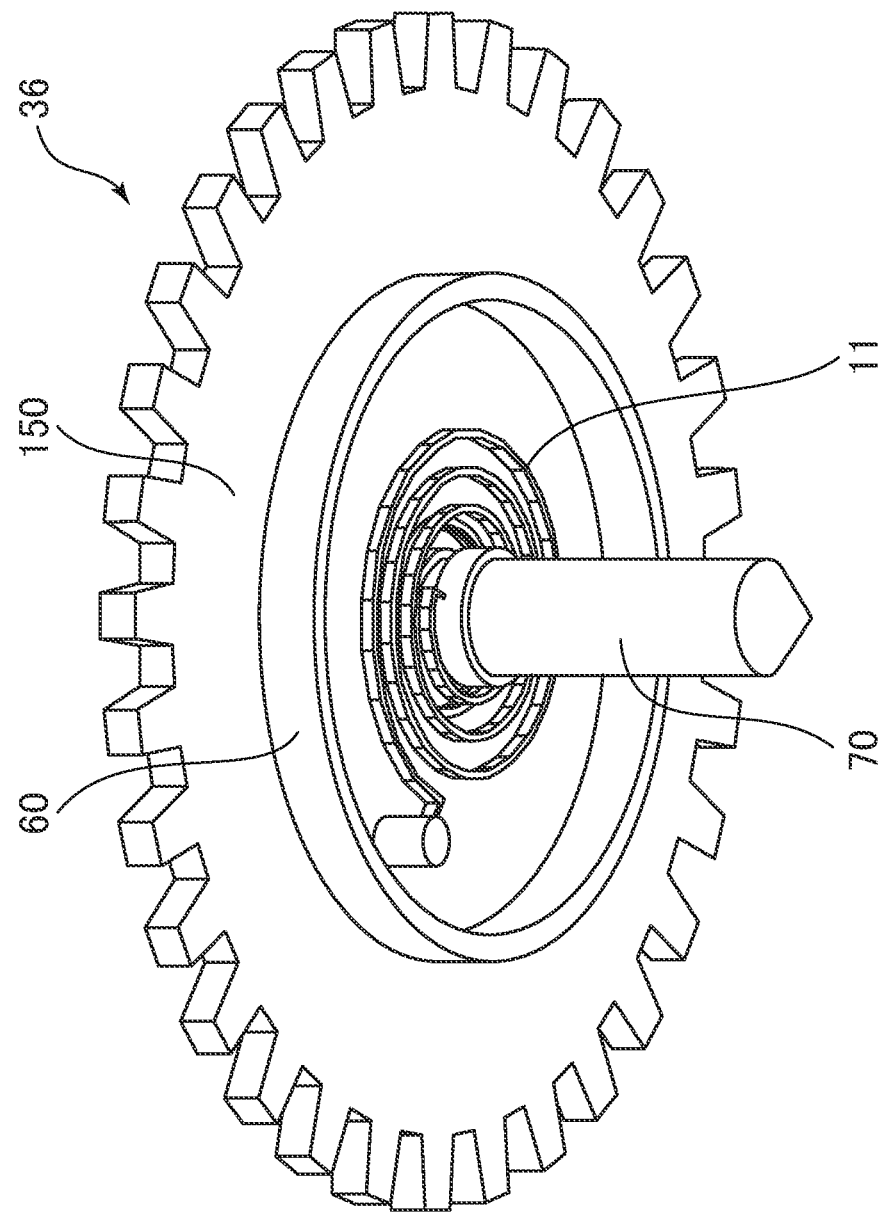
FIG. 13 is a perspective view for illustrating a main part of a power generation mechanism according to a third embodiment of the present invention.

FIG. 13 is a perspective view for illustrating a main part of a power generation mechanism 36 according to a third embodiment of the present invention. In FIG. 13, for the sake of representing characteristic parts of the third embodiment, illustration of the rotary weight, the electret electrode, and the counter electrode is omitted.

The power generation mechanism 36 includes a fixing wheel 150, and an electret electrode shaft 70 configured to integrally rotate with the electret electrode. The electret electrode shaft 70 is rotatably supported by a power generator case (not shown). The fixing wheel 150, the electret electrode, and the counter electrode are sequentially arranged in the order of the fixing wheel 150, the electret electrode, and the counter electrode in an axial direction of the electret electrode shaft 70.

The fixing wheel 150 is rotated by a rotational force transmitted from the rotary weight, which is supported in a freely rotatable manner and has a center of gravity shifted from the rotation center. Further, a through hole is formed at the rotation center portion of the fixing wheel 150, and the electret electrode shaft 70 is inserted through the through hole. Then, with the spiral spring 11, the fixing wheel 150 and the electret electrode shaft 70 are elastically connected to each other for their rotary motions. The electret electrode shaft 70 and the spiral spring 11 may be integrally molded with use of a micro-electro mechanical system (MEMS) technology.

Further, as illustrated in FIG. 13, an annular wall 60 is formed on the surface of the fixing wheel 150 (lower surface in this embodiment) and on the radially configured outer side of the spiral spring 11. This wall 60 restricts the extension of the spiral spring 11 to the radially configured outer side. Therefore, in addition to the effects described in the first embodiment, an effect of suppressing damages on the power generation mechanism 36 due to the full extension of the spiral spring 11 to the radially configured outer side can be expected. In FIG. 13, the wall 60 is formed annularly over the entire periphery in the circumferential direction, but the present invention is not limited to this configuration. As long as the extension of the spiral spring 11 can be restricted, for example, the wall can be partially formed in the circumferential direction. Further, the wall 60 may also serve as the guide portion 22b described in the second embodiment. That is, the wall 60 may be configured to slide against the electret electrode 22 so that the electret electrode and the counter electrode can maintain an appropriate gap therebetween. When the third embodiment is described in light of the general expression of the present invention, the rotary weight (not shown) corresponds to the first rotary member, the electret electrode (not shown) corresponds to the second rotary member, the counter electrode (not shown) corresponds to the stationary member, and the wall 60 corresponds to the restriction portion.

In the above, the embodiments according to the present invention are described. However, the specific configurations described in the embodiments are described as examples, and are not intended to limit the technical scope of the present invention to those embodiments. Various modifications may be made by a person skilled in the art to those disclosed embodiments. It is to be understood that the technical scope of the invention disclosed herein cover all such modifications.

The invention claimed is:

1. An electronic device, comprising a power generation mechanism comprising:
   at least one first rotary member, which is supported in a freely rotatable manner, and has a center of gravity shifted from a rotation center;
   at least one second rotary member supported in a freely rotatable manner;
   an elastic member configured to elastically connect the first rotary member and the second rotary member to each other for rotary motions thereof;
   a stationary member arranged so as to be opposed to the second rotary member; and
   an electret film formed on a surface of any one of the second rotary member and the stationary member.

2. The electronic device according to claim 1, wherein a value of a moment of inertia of the first rotary member and a value of a moment of inertia of the second rotary member are different from each other.

3. The electronic device according to claim 2, wherein the value of the moment of inertia of the first rotary member is larger than the value of the moment of inertia of the second rotary member.

4. The electronic device according to claim 1, wherein, when the elastic member is in a relaxed state, the following expression is satisfied:

$$0°<\theta<180°,$$

where $\theta$ represents an angle formed between a direction of the center of gravity of the first rotary member as viewed from the rotation center and a direction of a center of gravity of the second rotary member as viewed from the rotation center.

5. The electronic device according to claim 1, wherein the electret film is formed on the surface of the second rotary member.

6. The electronic device according to claim 1, wherein the second rotary member has a center of gravity shifted from the rotation center.

7. The electronic device according to claim 1, further comprising:
   an electret film formed on a surface of the first rotary member; and
   an additional stationary member arranged so as to be opposed to the first rotary member.

8. The electronic device according to claim 1, comprising a plurality of the second rotary members, a plurality of the stationary members, and a plurality of the elastic members,
   wherein the plurality of second rotary members are elastically connected to each other for rotary motions thereof by a corresponding one of the plurality of elastic members.

9. The electronic device according to claim 1, further comprising a restriction portion configured to restrict extension of the elastic member to a radially configured outer side.

10. The electronic device according to claim 1,
    wherein the second rotary member has a through hole formed therein at a rotation center portion thereof, and
    wherein the elastic member is received on an inner peripheral surface side of the through hole.

* * * * *

UNITED STATES PATENT AND TRADEMARK OFFICE
CERTIFICATE OF CORRECTION

PATENT NO. : 10,361,642 B2
APPLICATION NO. : 15/300780
DATED : July 23, 2019
INVENTOR(S) : Matsumoto et al.

Page 1 of 1

It is certified that error appears in the above-identified patent and that said Letters Patent is hereby corrected as shown below:

On the Title Page
In Item (73), "Citizen Holdings Co., Ltd. Tokyo (JP)" should be deleted.

Signed and Sealed this
Nineteenth Day of November, 2019

Andrei Iancu
*Director of the United States Patent and Trademark Office*